US012682727B2

(12) United States Patent
Du et al.

(10) Patent No.: US 12,682,727 B2
(45) Date of Patent: Jul. 14, 2026

(54) CABLE AND ELECTRONIC DEVICE

(71) Applicant: BEIJING BEYONDINFO TECHNOLOGY CO., LTD., Beijing (CN)

(72) Inventors: Hua Du, Beijing (CN); Zhenhe Cai, Beijing (CN); Hao Zhang, Beijing (CN)

( * ) Notice: Subject to any disclaimer, the term of this patent is extended or adjusted under 35 U.S.C. 154(b) by 43 days.

(21) Appl. No.: 18/781,999

(22) Filed: Jul. 23, 2024

(65) Prior Publication Data

US 2024/0378972 A1 Nov. 14, 2024

Related U.S. Application Data

(63) Continuation of application No. PCT/CN2022/141296, filed on Dec. 23, 2022.

(51) Int. Cl.

| | |
|---|---|
| ***G08B 5/36*** | (2006.01) |
| ***G08B 3/10*** | (2006.01) |
| ***G08B 7/06*** | (2006.01) |
| ***G08B 13/14*** | (2006.01) |
| ***H01R 13/66*** | (2006.01) |
| ***H01R 31/06*** | (2006.01) |

(52) U.S. Cl.

CPC ................. *G08B 5/36* (2013.01); *G08B 3/10* (2013.01); *G08B 7/06* (2013.01); *H01R 13/66* (2013.01); *H01R 13/6683* (2013.01); *H01R 31/06* (2013.01); *G08B 13/1418* (2013.01)

(58) Field of Classification Search

CPC ... G08B 5/36; G08B 3/10; G08B 7/06; G08B 13/1418; H01R 13/6683; H01R 31/065; H01R 13/66; H01R 13/717; H01R 31/06

See application file for complete search history.

(56) References Cited

U.S. PATENT DOCUMENTS

| | | | | |
|---|---|---|---|---|
| 9,876,320 | B2 * | 1/2018 | Coverston .......... | A61B 5/14552 |
| 10,355,425 | B2 * | 7/2019 | Gustafsson ............ | G08B 17/10 |
| 11,323,140 | B2 * | 5/2022 | Ono ........................ | H03M 1/86 |

FOREIGN PATENT DOCUMENTS

| | | | |
|---|---|---|---|
| JP | 2019125428 A | * | 7/2019 |

* cited by examiner

*Primary Examiner* — John A Tweel, Jr.

(57) ABSTRACT

The invention relates to a cable with a plugging and unplugging detection function and a corresponding electronic device. The cable comprises a first interface, a second interface, a sensor and a processing circuit. The sensor is used to detect whether the first interface and/or the second interface are inserted into the device interface, and the processing circuit is used to generate a digital detection signal. The cable can also include a power line, which is connected to the power supply terminal of the main device interface so that the processing circuit is powered by the main device interface, or powered by a rechargeable battery connected to the power line. The cable of the invention has simple structure and low cost, and can easily recognize plugging and unplugging of the cable without redesign or modification the electronic device interface.

10 Claims, 6 Drawing Sheets

CABLE AND ELECTRONIC DEVICE

CROSS-REFERENCE TO RELATED APPLICATION

This application claims the benefit of Chinese Patent Application No. 202220204993.4, filed on Jan. 25, 2022 in the China National Intellectual Property Administration, the disclosure of which is incorporated herein by reference.

BACKGROUND OF THE INVENTION

1. Technical Field

The invention relates to cable technology, in particular to a cable with a plugging and unplugging detection function and a corresponding electronic device.

2. Background Technology

Electronic devices often need various cables to provide power or transmit data. In order to provide power or transmit data, the cable needs to be firmly connected to the corresponding interface of the electronic device. In order to prevent poor contact or malicious disconnection between the cable and the device interface, the prior art has proposed some technologies for the plugging and unplugging detection or tightness detection of the cable and the interface.

For example, in the Chinese utility model patent with the publication number of CN209046357U, a UPS device with an interface monitoring device is proposed. The UPS device is equipped with an interface monitoring device. The interface monitoring device includes several micro pressure sensors, microprocessors, and alarms. The processors are connected to the micro pressure sensors and alarm signals respectively. When the cable plug is not fully inserted in place, the interface monitoring device can alarm through an alarm and prompt the staff to reinsert the cable plug into place to ensure the normal operation of the UPS device.

However, the cable plugging and unplugging detection of the prior art often relies on the operation of the electronic device. For example, in the scheme proposed by CN209046357U, an interface monitoring device needs to be additionally set in the UPS device and the corresponding interface monitoring steps need to be executed. This causes the cable plugging and unplugging detection technology to need to be specially designed or improved for an electronic device. It is not universal for all electronic devices, which hinders the wide application of cable plugging and unplugging detection technology. Therefore, there is a great need for a cable plugging and unplugging detection technology that can be used directly in all electronic devices without the need for special design or modification.

SUMMARY OF THE INVENTION

In view of this, the main purpose of the present disclosure is to solve the problems of poor universality and weak application scalability of current cable plugging and unplugging detection technology.

In order to solve the above technical problems, on the one hand, the present disclosure proposes a cable, including a first interface, a second interface, and a wire electrically connecting the first interface and the second interface. The first interface and the second interface are respectively used to connect the master device interface and the slave device interface. The cable also comprises: a sensor, at least one of the first interface and the second interface, for detecting whether the first interface and/or the second interface are inserted into the device interface and generating an analog detection signal; The processing circuit includes an analog-to-digital conversion element, which is connected to the output end of the sensor, and is used to generate a digital detection signal after analog-to-digital conversion of the analog detection signal output by the sensor.

According to the preferred embodiment of the present disclosure, the cable also includes a power line for connecting the processing circuit and the power supply terminal of the main device interface, so that the processing circuit is powered by the main device interface.

According to a preferred embodiment of the present disclosure, the processing circuit includes a rechargeable battery, and the charging end of the rechargeable battery is connected to the power line so that it can be charged through the power line, while supplying power to the processing circuit.

According to the preferred embodiment of the present disclosure, the cable also includes a battery for powering the processing circuit.

According to a preferred embodiment of the present disclosure, the processing circuit also includes an amplifier for amplifying the digital signal generated by the analog-to-digital conversion element.

According to a preferred embodiment of the present disclosure, the processing circuit also includes an indicator light for indicating the state of the digital detection signal.

According to the preferred embodiment of the present disclosure, the number of the indicator lights corresponds to the number of sensors to respectively indicate the status of digital detection signals from different sensors.

According to the preferred embodiment of the present disclosure, the processing circuit also includes an audible alarm which gives an audible alarm when the digital detection signal is in a predetermined state.

According to the preferred embodiment of the present disclosure, the cable also includes a detection line, which is used to transmit the analog detection signal output by the sensor to the analog digital conversion element. Alternatively, the disclosure provides an electronic device, including the aforementioned cable and the main device interface connecting the cable.

According to the preferred embodiment of the present disclosure, the electronic device also includes a warning device, which is used to receive and process the digital detection signal from the main device interface to perform the warning operation according to the status of the digital detection signal.

The cable of the invention has simple structure and low cost, and can easily realize the plugging and unplugging detection of the cable without redesign or modification the electronic device interface.

DETAILED DESCRIPTION

Figure 1:
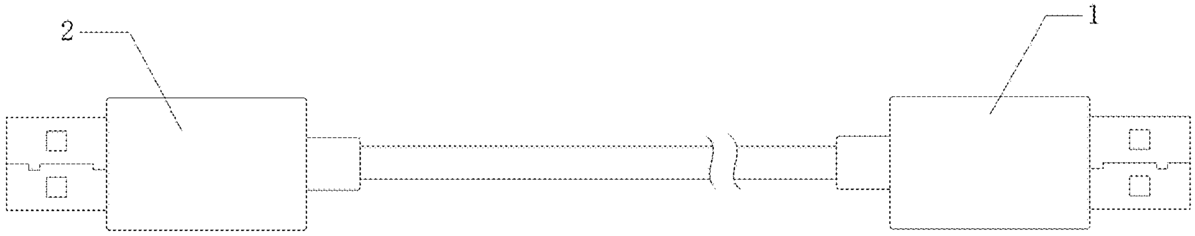
(Prior art) Fig. 1
FIG. 1 is the structural diagram of an embodiment of a USB cable of the prior art.

Exemplary embodiments of the present disclosure will be described in more detail below with reference to the accompanying drawings. Although exemplary embodiments of the disclosure are shown in the accompanying drawings, it should be understood that the disclosure can be implemented in various embodiments and should not be limited by the embodiments described herein. On the contrary, these embodiments are provided to enable a more thorough understanding of the disclosure, and to fully convey the scope of the disclosure to those skilled in the art.

In order to solve the problems of poor universality and weak application scalability of prior art cable plugging and unplugging detection technology, the present disclosure takes a different approach. Instead of seeking to implement plugging and unplugging detection on the interface of an electronic device or electronic equipment, the plugging and unplugging detection function is implemented on the cable. In this way, it is not necessary to redesign or modify the electronic device, but only to replace the existing cable with the cable of the invention to achieve plugging and unplugging detection, thus greatly improving the versatility of the technology and the universality of application.

It should be noted that the "cable" in this disclosure generally refers to an electronic cable; that is, the cable includes at least one pair of wires capable of transmitting current or electronic signals. However, the present disclosure does not exclude that it can be applied to some optical cables for transmitting optical signals, as long as the optical cables can contain wires for transmitting electronic signals. In addition, the said cable in the present disclosure has no restrictions on the interface to which it is connected, and the interface to which it is connected can be an existing interface type conforming to specific standards, or a special interface not defined according to standards.

Specifically, the cable in the present disclosure includes at least two interfaces, which are referred to here as the first interface and the second interface for distinguishing. Of course, in addition to the interface, the cable should also at least include the interface wire electrically connected. The wire can be used to transmit current, and the current can be used as the carrier of energy or signal. The present disclosure is not limited to the function of the current transmitted in the wire.

In addition, existing cables have different types, such as one to two, one to multiple or multiple to multiple. In such embodiments, a cable may include more than two interfaces. Therefore, the first interface and the second interface referred to in this disclosure do not refer to a particular interface, but may also include more than one interface. The first interface and the second interface essentially refer to different interfaces distinguished by different energy or signal inflow and outflow.

In this disclosure, the first interface and the second interface are respectively used to connect a master device interface and a slave device interface. The master device interface and slave device interface here correspond to the master device and slave device respectively. It should be noted that in this disclosure, the master device and the slave device are not the master and slave devices in terms of the function of the device itself, but the device that receives the plugging and unplugging detection signal is called the master device, and the device that does not receive the plugging and unplugging detection signal is called the slave device. The generation and transmission of the plugging and unplugging detection signal will be described below.

In order to perform plugging and unplugging detection, the cable of the present disclosure also includes a sensor, which is located with at least one of the first interface and the second interface, and is used to detect whether the first interface and/or the second interface are inserted into the device interface and generate a detection signal. This disclosure is not limited to specific sensor types for plugging and unplugging detection, for example, piezoelectric sensors, Hall sensors, photoelectric sensors, photoresistors, micro sensors, distance sensors or MEMS based sensors can be used. In the present disclosure, it is preferred to adopt piezoelectric sensors and generate analog detection signals.

The cable of the present disclosure also includes a processing circuit, which includes an analog-to-digital conversion element which is connected to the output end of the sensor to generate a digital detection signal after analog-to-digital conversion of the analog detection signal output by the sensor. The digital detection signal is transmitted from the processing circuit to the main device interface.

The master device interface is an interface located on the master device, and correspondingly, the slave device interface is an interface located on the slave device. The disclosure has no restrictions on the functions of the master device and the slave device, and no restrictions on the operating system and interface type of the device. That is, in principle, the present disclosure can be applied to any electronic device. In particular, the present disclosure is more applicable to industrial control hosts such as industrial computers with special operating systems, wherein it is not convenient to install software, and whose interfaces are also complex.

This disclosure sets both the sensor and the processing circuit in the cable. Since it is unnecessary to set a sensor or processing circuit in the device interface, the device can be provided with a feature of plugging and unplugging detection without special design or modification.

As an optional embodiment, when the detection signal is weak due to the long cable or the sensor itself, the processing circuit can also include an amplifier to amplify the digital signal generated by the analog digital conversion element. After the signal is amplified, it is beneficial to transmit the signal to a longer distance.

It is worth noting that although the present disclosure chooses to transmit the detection signal to the main device interface, this does not mean that the detection signal must be processed in the main device. Of course, it is a preferred embodiment of the present disclosure that the main device provides a corresponding processing program or processing software to process the detection signal and then perform further actions. However, as other preferred embodiments, the cable itself can also react or act on the detection signal, so that the cable with plugging and unplugging detection in the present disclosure can be plug_and_play, without causing additional burden on the main device.

As a preferred embodiment, the processing circuit of the present disclosure also includes an indicator light, which can be used to indicate the state of the digital detection signal. As previously mentioned, the analog to digital converter converts the analog detection signal into a digital detection signal. The status of the digital detection signal represents the plugging or unplugging status detected by the sensor. Therefore, in order to directly display the plugging or unplugging status, the indicator light is used to display the status of the digital detection signal, so that the user can clearly know the plugging or unplugging status of the corresponding interface of the current cable. For example, the LED light can be used to indicate that the corresponding cable connector is not inserted or pulled out. The color of the indicator light can also be used; for example, the red LED indicates that the cable connector is not inserted or pulled out, and the green LED indicates that the cable connector is inserted. At the same time, since sensors can be set at different interfaces of the cable in this disclosure, the number of the indicator lights can correspond to the number of sensors, so as to indicate the status of digital detection signals from different sensors respectively.

As a preferred embodiment, the processing circuit of the present disclosure also includes an audible alarm, such as a buzzer, and when the digital detection signal is in a predetermined state, the audible alarm performs an audible alarm. For example, when the plugging or unplugging status indicated by the digital detection signal is not connected or unplugged, the buzzer will beep for alarm.

As previously mentioned, the detection signal is transmitted to the main device interface, and the main device can process the detection signal. As an embodiment, the main device includes an alarm means, which is used to receive and process the digital detection signal from the main device interface to perform alarm operation according to the status of the digital detection signal. The alarm operation, such as sound, light, electricity and other alarms, can also be to send specific information to specific central control device, or warn terminal device of specific personnel through telephone, SMS and other means.

The embodiments of the present disclosure will be further described below with reference to the accompanying drawings.

Figure 2:
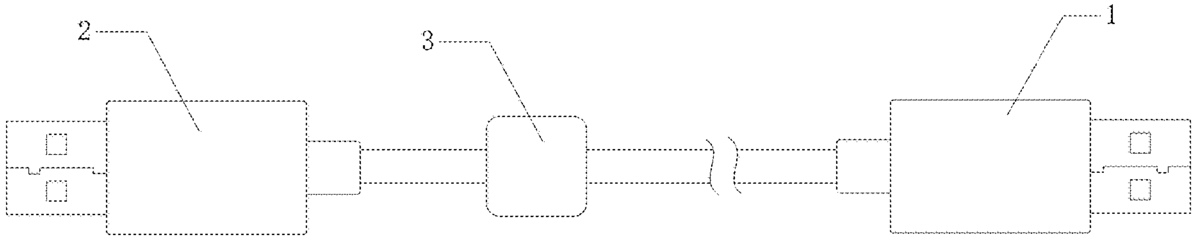
FIG. 2 is a structural diagram of USB cable in one embodiment of the present invention.

FIG. 1 is the structural diagram of an embodiment of a USB cable in the prior art. As shown in FIG. 1, the USB cable includes a first interface 1 and a second interface 2, and the first interface 1 and the second interface 2 are connected by a wire part. Compared with the prior art, FIG. 2 shows the structure of a USB cable of the present disclosure. Different from the prior art, the wire routing of the cable the present invention also includes a convex cavity part 3.

Figure 3:
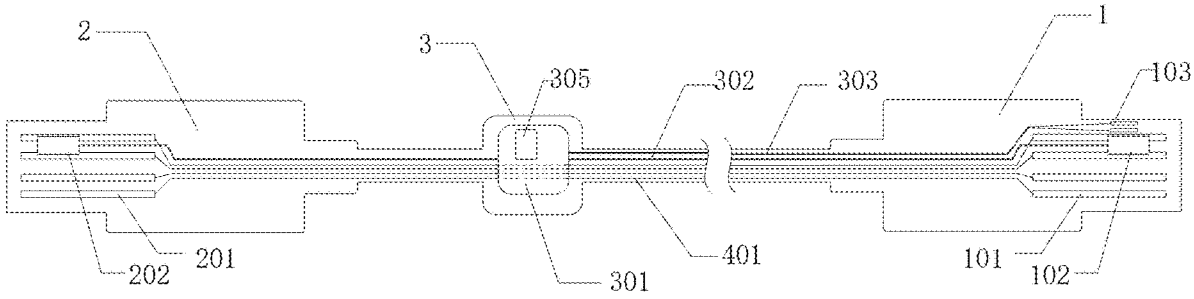
FIG. 3 is a sectional view of the first embodiment of the USB cable shown in FIG. 2.

FIG. 3 is a sectional view of the first embodiment of the USB cable shown in FIG. 2. As shown in FIG. 3, the first interface 1 of the USB cable is provided with a plurality of first terminals 101, and the second interface 2 is provided with a plurality of second terminals 201. The first terminal 101 and the second terminal 201 are connected through a wire 401. In addition, the cavity part 3 is provided with a processing circuit 301, which can be constructed of a sheet-shaped circuit board and circuit elements on it. The wire 401 is not in contact with the circuit part of the processing circuit 301, that is, the processing circuit 301 does not affect the signal transmission of the wire 401. The processing circuit 301 at least includes an analog digital conversion element.

Referring to FIG. 3 again, the first interface 1 and the second interface 2 of this embodiment are also equipped with sensors, which are used to detect the plugging or unplugging status of the interface. The first sensor 102 is in the first interface 1, and the second sensor 202 is in the second interface 2. The first sensor 102 and the second sensor 202 are connected with the processing circuit 301 through the detection line 302. The detection line is used to transmit the analog detection signal output by the first sensor 102 and the second sensor 202 to the analog-to-digital conversion element 305 of the processing circuit 301. The analog-to-digital conversion element 305 is used for analog-to-digital conversion of analog detection signals output from the first sensor 102 and the second sensor 202 to generate a digital detection signal, which is transmitted to the main device interface by the processing circuit. The analog-to-digital conversion element 305 is, for example, an analog-to-digital converter, which can be one or two. When the number of the analog-to-digital converter is one, it has multiple inputs and multiple outputs to convert the analog detection signals of the first sensor 102 and the second sensor 202 into two digital detection signals respectively. When there are two analog-to-digital converters, they respectively receive analog detection signals from the first sensor 102 and the second sensor 202 and output digital detection signals.

In this embodiment, the two output digital detection signals are transmitted to the electronic device connected with the first interface 1 through the signal line (not shown in FIG. 3). However, this is only an optional implementation mode, and not all of them need to transmit two digital detection signals to the electronic device connected with the cable.

Figure 4:
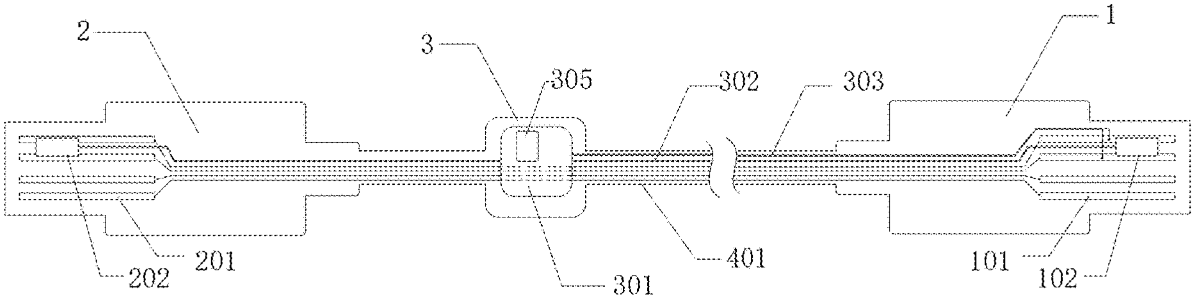
FIG. 4 is a sectional view of the second embodiment of the USB cable of the present invention.

In this embodiment, the processing circuit 301 of the cable is powered by the main device interface. Therefore, the cable also includes a power line 303, which is connected with the processing circuit 301 and the power supply terminal 103 of the main device interface, so that the processing circuit is powered by the main device interface. As shown in FIG. 3, the power supply terminal 103 in this embodiment is different from the first terminal 101, that is, it is an independent power supply terminal. However, the power supply terminal can also be realized by some terminals with power supply function in the first terminal 101. For example, in another embodiment shown in FIG. 4, the power line is connected to two terminals with power supply function in the first terminal 101 of the USB cable. It should be noted that although it is not specially drawn in FIGS. 3 and 4, those skilled in the art should understand that the power line 303 usually includes two wires, so it usually needs to be connected to two terminals. In addition, in order to ensure stable power supply or, a voltage stabilizing circuit or a current stabilizing circuit can be set in the processing circuit. In addition, when the processing circuit needs specific voltage power supply, corresponding voltage conversion elements or related circuits can be set in the processing circuit. The above circuits are conventional circuits in the field, and will not be specifically described here.

Figure 5:
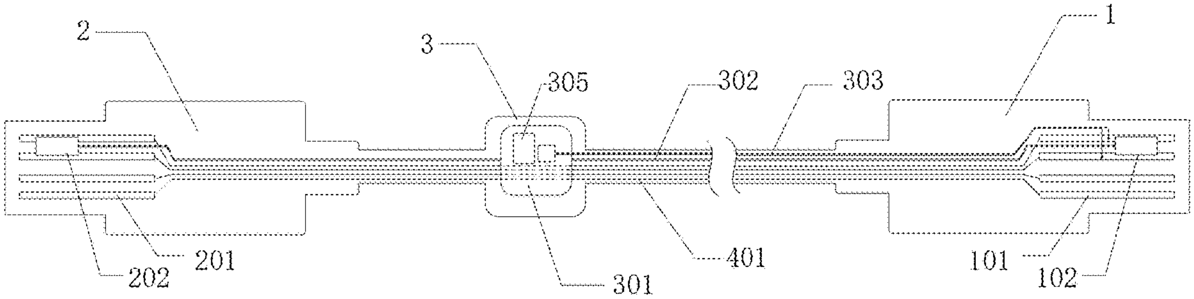
FIG. 5 is a sectional view of the third embodiment of the USB cable of the present invention.

FIG. 5 is a sectional view of the USB cable of the third embodiment of the present disclosure. As a variation of the first and second embodiments, a rechargeable battery can be set in the processing circuit, and the charging end of the rechargeable battery is connected to the power line 303. The rechargeable battery charges through the power line, and supplies power to the processing circuit 301 at the same time. Corresponding charging and discharging circuits can be provided in the processing circuit 301 for support. Thus, when the USB cable and the first interface 1 are normally connected to the main device interface, the main device interface can supply power to the rechargeable battery in the processing circuit 301. When the first interface 1 is disconnected from the main device interface or pulled out abnormally, the rechargeable battery can continue to supply power to the processing circuit to provide signal processing and alarm operation.

Figure 6:
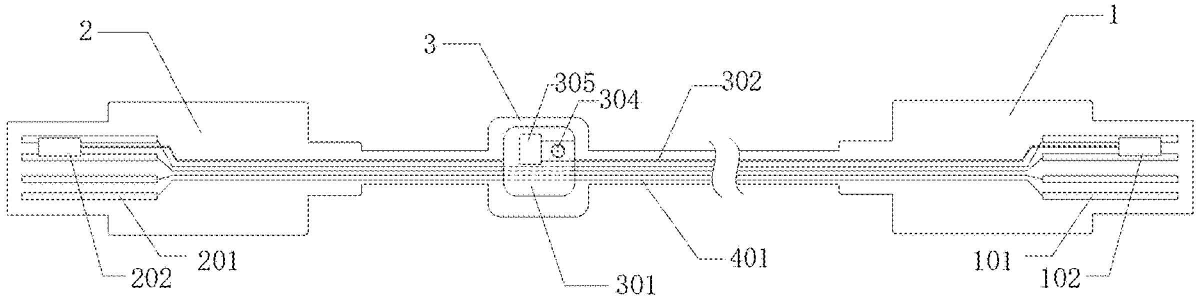
FIG. 6 is a sectional view of the fourth embodiment of the USB cable of the present invention.

FIG. 6 is a sectional view of the USB cable of the fourth embodiment of the present disclosure. As shown in FIG. 5, unlike the previous embodiment, the embodiment does not include a power line 303, but instead includes a battery 304 in the cavity part 3. In specific implementation, a detachable and universal button battery can be used. In order to install the battery 304 in the cavity part 3, the cavity part 3 needs to be provided with a battery cavity and a corresponding cover plate. The battery holding chamber and the corresponding cover plate are the conventional structures of electronic device, so they will not be repeated here.

In the above embodiments, the USB cable also includes a wire sleeve, the signal line, detection line, power line, etc. are all wrapped in the wire sleeve, the cavity part is located between the first interface and the second interface, and the wire sleeve also covers the cavity part.

It should be noted that the above embodiments only take the USB cable as an example, that is, the first interface 1 and the second interface 2 of the above embodiments are interface types compatible with the USB standard. However, the present disclosure is not limited to the interface type of the upper body. In fact, any cable that transmits power or signal and has a plugging and unplugging detection requirement can be applied to the present disclosure, such as serial port line and network port line.

Similarly, it should be understood that in order to simplify the disclosure and help understand one or more of the various aspects of the disclosure, in the above description of the exemplary embodiments of the disclosure, various features of the disclosure are sometimes grouped together into a single embodiment, diagram, or description thereof. However, the disclosed method should not be interpreted as reflecting the intention that the claimed disclosure has more features than those explicitly recorded in each claim. Therefore, the claims that follow the specific embodiment are hereby explicitly incorporated into the specific embodiment, wherein each claim itself is a separate embodiment of the present disclosure.

Those skilled in the art can understand that the modules in the device in the embodiment can be adaptively changed and set in one or more devices different from the embodiment. The modules or units or components in the embodiment can be combined into one module or unit or component, and they can be divided into multiple sub modules or sub units or sub components. Except that at least some of such features and/or processes or units are mutually exclusive, any combination may be used to combine all features disclosed in the specification (including accompanying claims, abstract and drawings) and all processes or units of any method or device so disclosed. Unless otherwise expressly stated, each feature disclosed in the specification (including accompanying claims, abstract and drawings) can be replaced by providing alternative features for the same, equivalent or similar purposes.

In addition, those skilled in the art can understand that although some embodiments described herein include some features included in other embodiments rather than other features, the combination of features of different embodiments means that they are within the scope of the disclosure and form different embodiments. For example, in the claims, any one of the embodiments claimed can be used in any combination.

The specific embodiments described above have further described the purpose, technical scheme and beneficial effects of this disclosure in detail. It should be understood that this disclosure is not inherently related to any specific computer, virtual device or electronic device, and various general devices can also realize this disclosure. The above is only a specific embodiment of the disclosure and is not intended to limit the disclosure. Any modification, equivalent replacement, improvement, etc. made within the spirit and principles of the disclosure should be included in the protection scope of the disclosure.

The invention claimed is:

1. A cable comprising a first interface, a second interface, and a wire that electrically connects the first interface and the second interface, wherein the first interface and the second interface are respectively used for connecting a master device interface and a slave device interface, and the cable further comprises:

a sensor, located at least one of the first interface and the second interface, for detecting whether the first interface and/or the second interface is inserted into the device interface and generating an analog detection signal;

a processing circuit comprising an analog-to-digital conversion element that is connected to the output terminal of the sensor and is used for generating a digital detection signal after carrying out analog-to-digital conversion of the analog detection signal of the output of the sensor.

2. The cable as claimed in claim 1, wherein the cable further comprises a power supply line for connecting the processing circuit and the power supply terminal of the main device interface, so that the processing circuit is supplied by the master device interface.

3. The cable as claimed in claim 2, wherein the processing circuit comprises a rechargeable battery, and the charging end of the rechargeable battery is connected to the power supply line so that it can be charged through the power supply line and provide power to the processing circuit simultaneously.

4. The cable as claimed in claim 1 wherein the cable further comprises a battery, which is used for supplying power to the processing circuit.

5. The cable as claimed in claim 1, wherein the processing circuit further comprises an amplifier for amplifying the digital signal generated by the analog-to-digital conversion element.

6. The cable as claimed in claim 1, wherein the processing circuit further comprises an indicator light for indicating the state of the digital detection signal.

7. The cable as claimed in claim 6, wherein a number of indicator lights corresponds to the number of sensors to indicate the state of the digital detection signals derived from different sensors respectively.

8. The cable as claimed in claim 1, wherein the processing circuit further comprises a sound alarm, and when the digital detection signal is in predetermined state, the sound alarm activates.

9. The cable as claimed in claim 1, wherein the cable further comprises a detection wire that is used for transmitting the analog detection signal of the sensor output to the analog-to-digital conversion element.

10. An electronic device comprising the cable as claimed in claim 1, and a main device interface connecting the cable.

* * * * *